United States Patent
Kiriyama et al.

(10) Patent No.: US 9,616,802 B1
(45) Date of Patent: Apr. 11, 2017

(54) APPARATUS AND METHOD TO VISUALLY COMMUNICATE WITH A VEHICLE

(71) Applicant: AISIN TECHNICAL CENTER OF AMERICA, INC., Northville, MI (US)

(72) Inventors: Hiroshi Kiriyama, Novi, MI (US); Shogo Kimura, Novi, MI (US); Mineo Kurita, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/930,365

(22) Filed: Nov. 2, 2015

(51) Int. Cl.
| | | |
|---|---|---|
| *B60Q 1/26* | (2006.01) | |
| *B60Q 1/00* | (2006.01) | |
| *G07C 9/00* | (2006.01) | |
| *B60R 25/20* | (2013.01) | |
| *B60R 25/24* | (2013.01) | |

(52) U.S. Cl.
CPC ........ *B60Q 1/0023* (2013.01); *B60R 25/2054* (2013.01); *B60R 25/246* (2013.01); *G07C 9/00007* (2013.01); *G07C 9/00309* (2013.01); *B60Q 2400/50* (2013.01); *G07C 2009/00984* (2013.01)

(58) Field of Classification Search
CPC B60Q 1/0023; B60Q 2400/50; B60R 25/246; B60R 25/2054; G07C 9/00309; G07C 9/00007; G07C 2009/00984
USPC ....... 340/468, 425.5, 461, 463, 458, 426.13, 340/426.28, 426.29; 348/77; 362/501, 362/487; 701/301
See application file for complete search history.

(56) References Cited

U.S. PATENT DOCUMENTS

| | | | | | |
|---|---|---|---|---|---|
| 5,929,769 | A | * | 7/1999 | Garnault | B60R 25/2009 340/12.51 |
| 2010/0321945 | A1 | * | 12/2010 | Lang | B60Q 1/2669 362/501 |
| 2011/0242303 | A1 | * | 10/2011 | Giraud | E05B 81/78 348/77 |
| 2011/0276234 | A1 | * | 11/2011 | Van Gastel | E05B 81/78 701/49 |
| 2012/0158253 | A1 | * | 6/2012 | Kroemke | B60R 25/2054 701/49 |
| 2013/0151036 | A1 | * | 6/2013 | Harumoto | F02N 11/0807 701/2 |

(Continued)

FOREIGN PATENT DOCUMENTS

JP 2015-021237 2/2015

OTHER PUBLICATIONS

International Search Report and Written Opinion issued Sep. 26, 2016 in PCT/US16/48845.

*Primary Examiner* — Anh V La
(74) *Attorney, Agent, or Firm* — Oblon, McClelland, Maier & Neustadt, L.L.P.

(57) ABSTRACT

A visual communication apparatus affixed to a vehicle. The visual communication apparatus includes a smart key system that detects a key fob of a user within a keyless detection zone, a projector projecting visual indications on a projecting zone lying on a ground surface of the vehicle, a sensor optically capturing gestures of the user of the vehicle, and an electrical control unit capable of actuated key elements of the vehicle. The visual indications include passive visual indications requiring no activation from the user and active visual indications requiring activations from the user. The activations are performed by gestures of the user on the active visual indications.

9 Claims, 6 Drawing Sheets

(56) References Cited

U.S. PATENT DOCUMENTS

2014/0285319 A1* 9/2014 Khan ................. G07C 9/00309
340/5.61

* cited by examiner

APPARATUS AND METHOD TO VISUALLY COMMUNICATE WITH A VEHICLE

BACKGROUND

Field of the Disclosure

The present disclosure relates to an apparatus and method to visually communicate with a vehicle. More precisely, embodiments give the possibility to request commands for the vehicle as well as to obtain information about the vehicle.

Description of the Related Art

Vehicles providing various remote services such as remote starting, door locking or light switching by actuating buttons on a key fob have been known and widely used. However, such systems requiring the action of at least one hand and can be inconvenient when the hands of the user are full.

Recently, there have been technical attempts to detect the intentions of the user without having the user use her/his hands. Such technical attempts have notably been focused on automatic trunk opening via a smart key device. For example, such systems require the user to stand on one foot while moving the second foot below a motion detector placed on the vehicle, or require the user to stand for a relatively long period of time in front of a presence detector placed on the vehicle.

Though such systems provide certain ease and comfort to the user by enabling the opening of the backside door while the hands are not free, they have numerous drawbacks. Such systems might generate balance issues for the user which could result in an uncomfortable position. But mostly, in such systems the communication between the user and the vehicle is extremely limited resulting in misinterpretation from the vehicle, resulting in inadvertent actuation or unknown condition of the vehicle. For example, the backside door is unwillingly open by the system while the user is standing behind the trunk or the backside door is just unlatched but not open enough for the user to clearly see it. Thus, an apparatus and method to visually communicate with a vehicle solving the aforementioned problems of limited communication is desired. (Related Publication JP2015-021237A)

SUMMARY

Accordingly, the object of the present disclosure is to provide an apparatus and a method to visually communicate with a vehicle which overcomes the above-mentioned limitations.

The apparatus ensures better communication by providing two-way communication between the user and the vehicle through visual indications projected on a ground surface. These visual indications provide a way for the user to input commands for the vehicle (e.g., opening/closing door, turning on/off light) as well as for the vehicle to display information about the conditions of the vehicle to the user or other person near the vehicle (e.g., door opened/closed, light on/off, fuel/battery level, vehicle is backing up).

The visual indications act in a similar way as the keys of a computer keyboard on which the user perform a gesture (e.g., stepping, feet tapping, heel raising, standing still) to activate a specific command symbolized by a corresponding visual indication. Once a corresponding visual indication has been activated, the vehicle knows unmistakably and precisely which command is requested by the user. In addition, the visual indications act similarly as the screen of a computer by displaying information about the conditions of the vehicle in a clear and understandable way for the user.

Furthermore, the visual indications have the ability to follow/track the position of the user and be always placed at a convenient location for the user.

In one non-limiting illustrative example, a visual communication apparatus of a vehicle is presented. The visual communication apparatus of a vehicle includes a smart key system that identifies the user by detecting a key fob of a user within a keyless detection zone, a projector that projects visual indications on a projecting zone on a ground surface, a sensor that optically captures gestures of a user, and a control unit that actuates important elements of the vehicle in response to the gestures.

In another non-limiting illustrative example, a method to communicate with a vehicle through a visual communication apparatus is presented. The visual communication apparatus includes a projector that projects visual indications on a ground surface, and a sensor that optically captures gestures of a user. The method to communicate with a vehicle through a visual communication apparatus includes detecting the presence of a key fob of the user inside a keyless detection zone through a smart key system, detecting the presence of the user inside the projecting zone, computing a location and a normal direction of the user inside the projecting zone, projecting visual indications at a predetermined distance from the location of the user and at a predetermined direction from the normal of the user, detecting gestures of the user in response to the visual indications, actuating key elements of the vehicle through an electrical control unit in response to the gestures, and indicating to the user that the key elements are being executed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1:
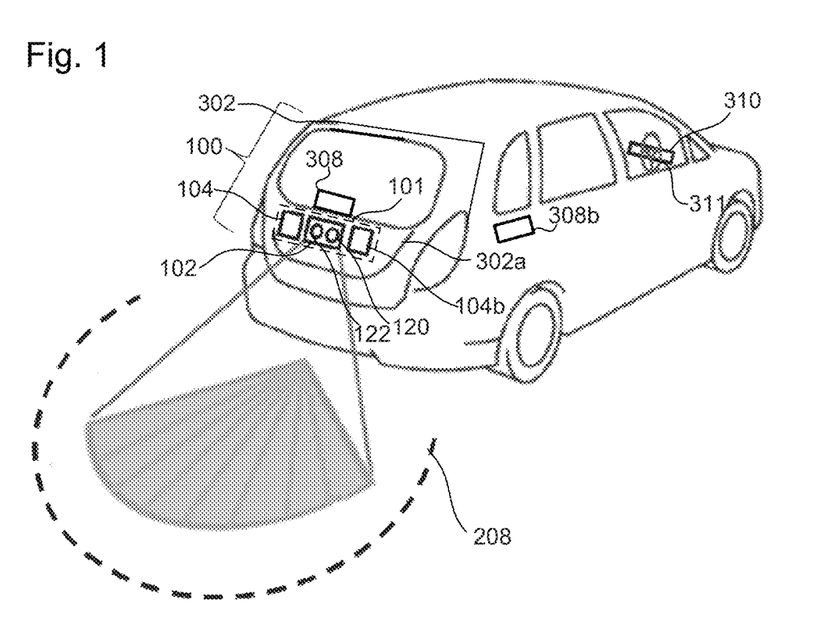
FIG. 1 is a perspective view of a visual communication apparatus affixed to a vehicle, according to certain aspects of the disclosure.
Figure 2:
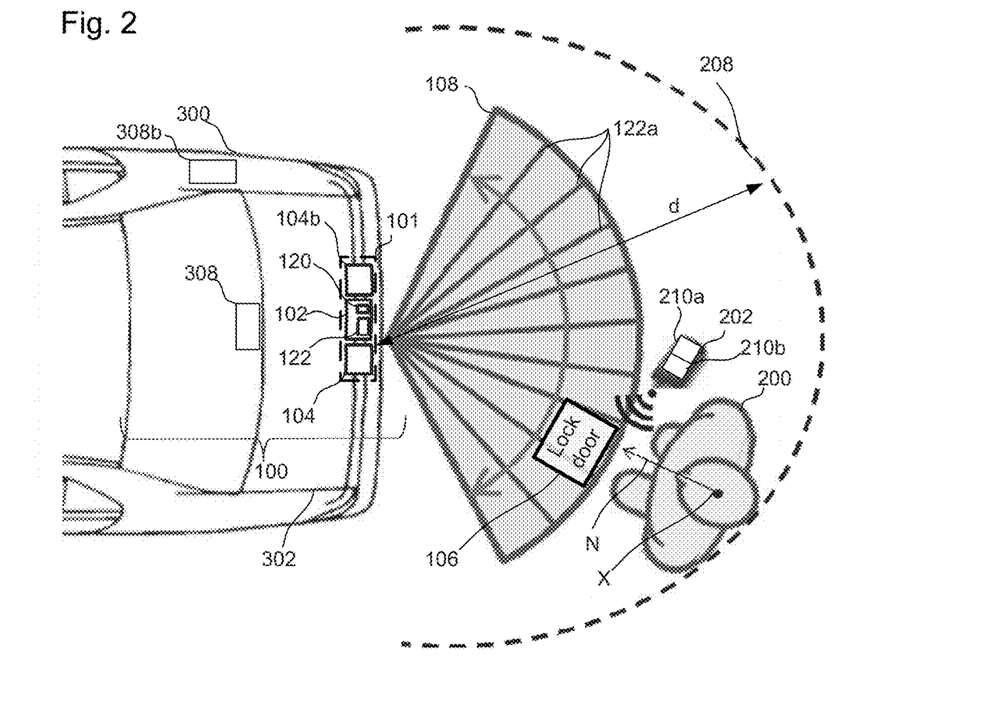
FIG. 2 is a top view of the visual communication apparatus affixed to the vehicle, according to certain aspects of the disclosure.
Figure 3A:
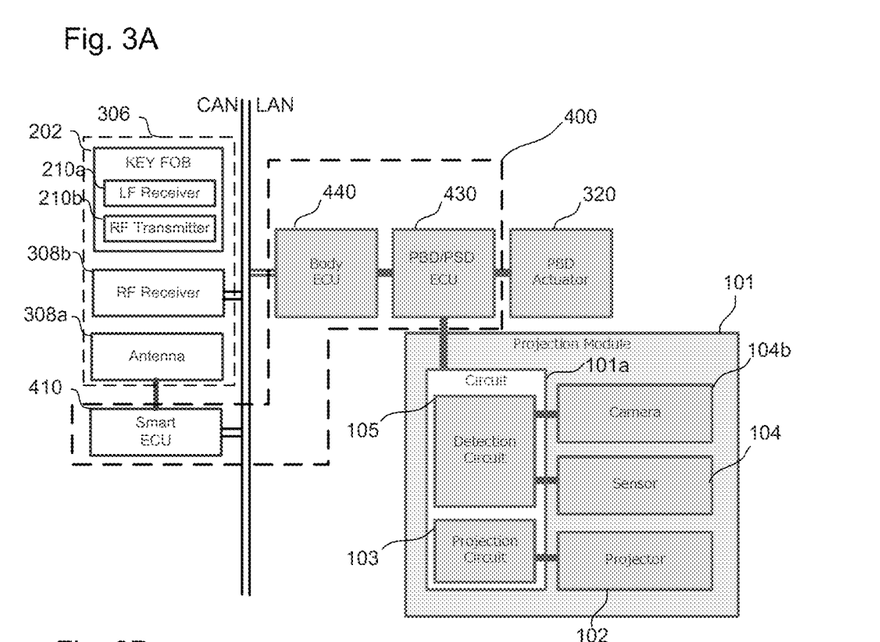
FIG. 3A is a schematic view of a hardware diagram of the visual communication apparatus in an integrated model, according to certain aspects of the disclosure.
Figure 3B:
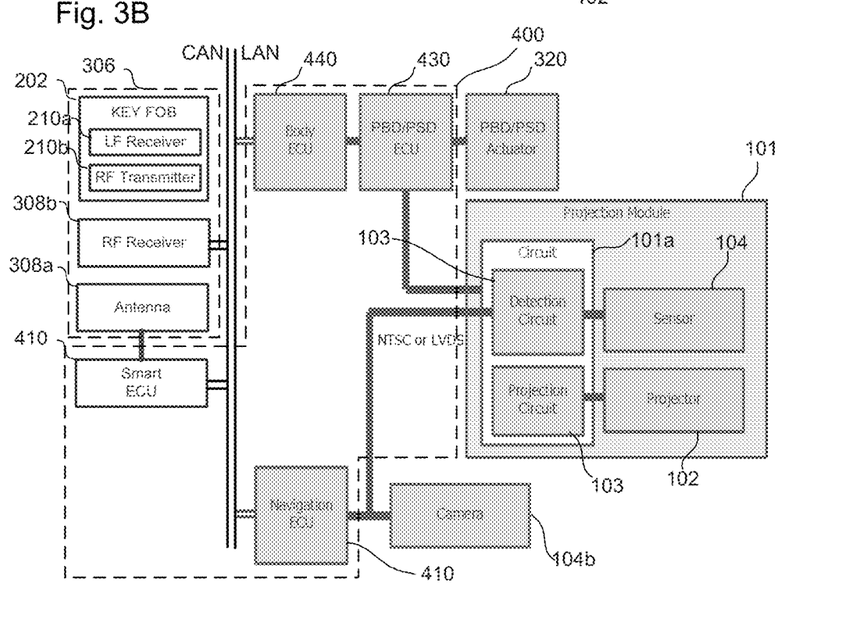
FIG. 3B is a schematic view of a hardware diagram of the visual communication apparatus in a separated model, according to certain aspects of the disclosure.

FIGS. 1-2 are a perspective view and a top view, of a visual communication apparatus 100, respectively, according to certain aspects of the disclosure. FIGS. 3A-3B are schematic views of hardware diagrams of the visual communication apparatus in an integrated model and in a separated model, respectively, according to certain aspects of the disclosure. The visual communication apparatus establishes a visual communication between the vehicle 300 and a user 200 having a key fob 202 through a projection module 101.

The projection module 101 may be mounted on a backside 302 of the vehicle 300 for power back door (PBD) vehicles (e.g., vehicles having a motorized trunk door 302a, as illustrated in FIGS. 1-2), or mounted on a side of the vehicle 300 for power slide door (PSD) vehicles (e.g., vehicles having a motorized door on a side).

The projection module 101 is linked to main circuitry 400 including different control elements of the vehicle 300. For example, these different control elements may be a smart ECU 410 controlling a smart key system 306 that identifies the key fob 202 of the user 200 within a keyless detection zone 208, or a body ECU 440 with a PBD/PSD ECU 430 that operates the PBD and/or the PSD via a PBD/PSD actuator 320.

The smart key system 306 may include an antenna 308a affixed to the vehicle 3000, a Low Frequency (LF) receiver 210a and a Radio Frequency (RF) transmitter 210b both integrated into the key fob 202, and a RF receiver 308b affixed to the vehicle 300. The antenna 308a broadcasts a first group of radio waves, e.g. 120-135 kHz, over the keyless detection zone 208, wherein the keyless detection zone 208 may be within a predetermined distance d from the visual antenna 308a. Once the key fob 202 is inside the keyless detection zone 208, the LF receiver 210a receives the first group of radio waves broadcasted by the antenna 308a and the RF transmitter 210b broadcasts back to the vehicle 300 a second group of radio waves, e.g. 300-400 MHz. Then, the second group of radio waves is received by the RF receiver 308b. In addition, a smart ECU 410 of the main circuitry 400 controls the broadcasting of the first group of radio waves and detects the reception of the second group of radio waves in order to identify the presence of the key fob 202, and of the user 200, inside the keyless detection zone 208.

The smart key system 306 may be in communication with the body ECU 440, or other elements of the main circuitry 400, via a bus such as a Controller Area Network (CAN) bus or Local Interconnect Network (LIN) bus.

The visual communication apparatus 100 may also include a steering wheel angle sensor 310 placed on a steering wheel 311 of the vehicle 300. The steering wheel angle sensor 310 enables to measure a steering angle to estimate a direction in which the vehicle 300 is displaced.

The steering wheel angle sensor 310 may rely on electromagnetic sensors or potentiometers to detect the steering angle.

The projection module 101 includes a projector 102 projecting visual indications 106 (e.g., symbols or text messages) on a projecting zone 108, and a sensor 104 optically capturing important information about the user 200. The projection module 101 includes circuitry 101a having a detection circuit 105 to operate the sensor 104 and a projection circuit 103 to operate the projector 102. The main information about the user 200 may include the presence of the user 200 inside the projecting zone 108, a location X of the user 200 inside the projecting zone 108, a normal direction N of the user 200, and gestures of the user 200 (e.g., stepping, foot tapping, heel raising or standing still).

The optically captured main information about the user 200 are analyzed and converted into specific commands for the vehicle 300 by software instructions executed by the circuitry 101a including the detection circuit 105 and the projection circuit 103. For example, the specific commands may include opening/closing the back door or the side door of the vehicle 300. For instance, such command may be performed via a control load sent from the circuitry 101a to the PBD/PSD ECU 430 of the main circuitry 400.

Such an analysis may be performed through optical detections using the orientation of the light reflected, through digital image processing using tools such as color intensity differences, image segmentations, edge detections, or through any technique known by someone having ordinary skill in the art.

The projecting zone 108 may be lying on a ground surface of the vehicle 300 and have different shapes such as a square, a triangle with an apex below the visual communication apparatus 100, or a slice of a disc with a center below the visual communication apparatus 100. In addition, the projecting zone 108 may be included inside the keyless detection zone 208.

The projector 102 may be any kind of light emitting devices capable of projecting symbols and text messages visible by the naked eye and with a resolution and contrast sufficiently high to be viewed or read by the user 200 without any difficulty and independently of the luminosity surrounding the vehicle 300.

The sensor 104 may be any kind of light capturing devices capable of detecting light reflected on the projecting zone 108 and the user 200 with sufficient precision and speed to be analyzed by the circuitry 101a and provide the main information about the user 200.

In an exemplary embodiment, the projector 102 may include a first laser diode 120 projecting symbols and text visible to the naked eye and may also include a second laser diode 122 projecting a plurality of invisible beams of light 122a on the projecting zone 108. The user 200 on the projecting zone 108 breaks some of the invisible beams of light 122a and reflects light back to the sensor 104 under the form of reflected infrared beam. The sensor 104 detects and captures images of the reflected infrared beam. The captured images of the reflected infrared beam are then analyzed via software instructions to obtain the main information about the user 200 such as the presence on the user 200 in the projecting zone 108, the location X of the user 200, the normal direction N of the user 200, and the gestures of the user 200.

In another exemplary embodiment, the projector 102 may rely on Light-Emitting Diodes (LED) technology, Digital Light Processing (DLP) technology, liquid-crystal display (LCD) technology, liquid crystal on silicon technology or any other technologies known by a person having ordinary skill in the art.

In addition to the sensor 104, the projection module 101 may include an analog or digital camera 104b for detecting the gestures of the user 200 in the projecting zone 108 under the form of images and/or videos. The camera 104b may include an electronic image pickup device (e.g., photo electric elements) and an optical system having an optical lens with a variable diaphragm and a shutter to control the amount of light entering the image pickup device.

The gestures of the user 200 are obtained by analyzing images and/or videos of the user 200, captured by the camera 104a. This analysis may be performed by the circuitry 101a via image processing tools such as color intensity differences, image segmentations, edge detections.

The camera 104a may be directly integrated into the projection module 101, see FIG. 3A, or separated from the projection module 101 and linked to the main circuitry 400 via a navigation ECU 420 of the vehicle 300, see FIG. 3B.

When the camera 104a is separated from the projection module 101, the images and/or video captured by the camera 104a may be sent to the circuitry 101a via standard video protocols such as low voltage differential system (LVDS) protocol and/or national television system committee (NTSC) protocol.

Figure 4:
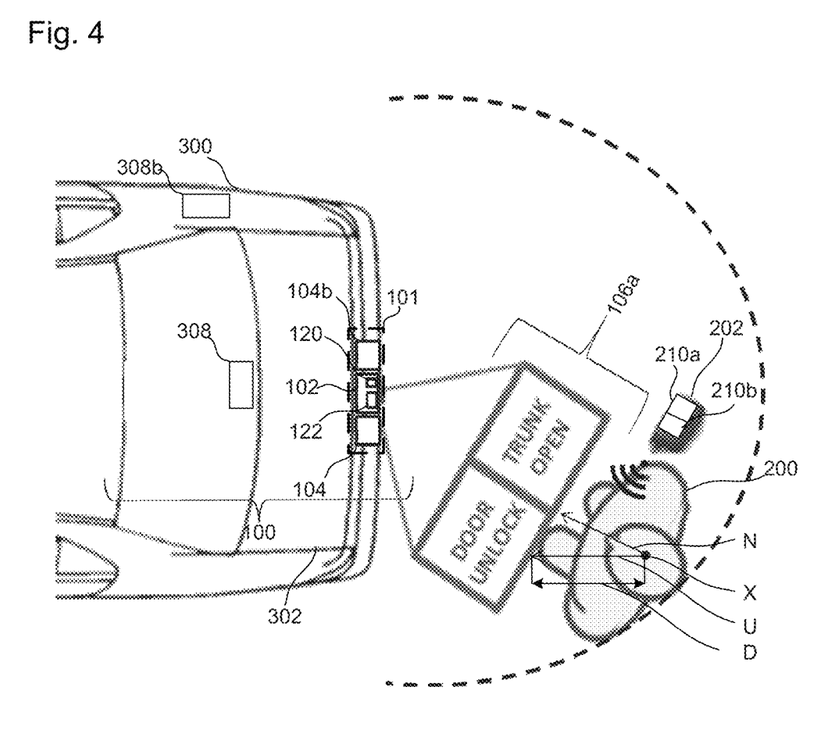
FIG. 4 is top view of the visual communication apparatus projecting active visual indications to an user, according to certain aspects of the disclosure.

FIG. 4 is a top view of the visual communication apparatus 100 projecting active visual indications 106a to the user 200, according to certain aspects of the disclosure.

The visual indications 106 may include the active visual indications 106a requiring an input from the user 200. The active visual indications 106a may be symbols (e.g., V-shaped lines, rectangles, squares, circles, arrows) or text being placed at a predetermined distance D from the location X and at a predetermined direction U from the normal direction N of the user 200, such as in front or on the side of the user 200, as illustrated in FIG. 4. The input from the user 200 is given by the gestures of the user 200 on the active visual indications 106a. The gestures of the user 200 (e.g., stepping, tapping, heel raising or standing still) are performed on the active visual indications 106a to request the vehicle 300 to perform specific commands (e.g., turning on/off lights of the vehicle 300, opening/closing a door of the vehicle 300, as illustrated in FIG. 4).

In addition, the active visual indications 106a can be modified (e.g., changing the color, shape or text of the active visual indications 106a) to indicate to the user 200 that the gestures have been recognized and the commands are being executed by the vehicle 300.

Figure 5:
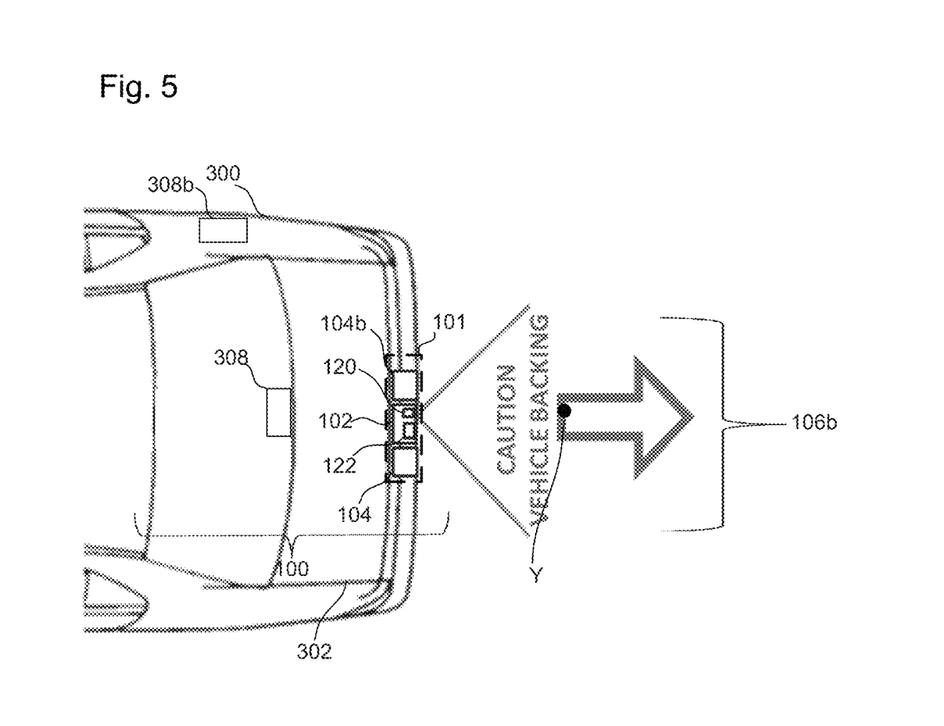
FIG. 5 is a top view of the visual communication apparatus projecting passive visual indications to the user and other persons, according to certain aspects of the disclosure.

FIG. 5 is a top view of the visual communication apparatus 100 projecting passive visual indications 106b to the user 200 and other persons, according to certain aspects of the disclosure.

The visual indications 106 may also include passive visual indications 106b requiring no input from the user 200. The passive visual indications 106b may be symbols (e.g., arrows, gauge indicators, warning signals) or text providing information about the vehicle 300 (e.g., vehicle moving in the direction of the arrows, low fuel, low battery, low oil pressure, or low tire pressure) to the user 200 and/or other persons. The passive visual indications 106b may be placed at the predetermined distance D from the location X and at the predetermined direction U from the normal N when the user 200 is present in the projecting zone 108, as illustrated in FIG. 4 or centered at a second predetermined location Y inside the projecting zone 108 when the user 200 is not present in the projecting zone 108, as illustrated in FIG. 5.

In another exemplary embodiment, the passive visual indication 106b may be used to inform on the motion of the vehicle 300 as soon as the vehicle 300 is ready to be put in motion, (e.g., a reverse gear is engaged or a parking brake is released by the user 200). The passive visual indication 106b indicating on the motion on the vehicle 300 may be at least one arrow pointing in the direction of the motion of the vehicle 300. The direction of the motion of the vehicle 300 may be detected by the steering wheel angle sensor 310 and used to orient the at least one arrow projected on the projecting zone 108, as illustrated in FIG. 5.

Figure 6:
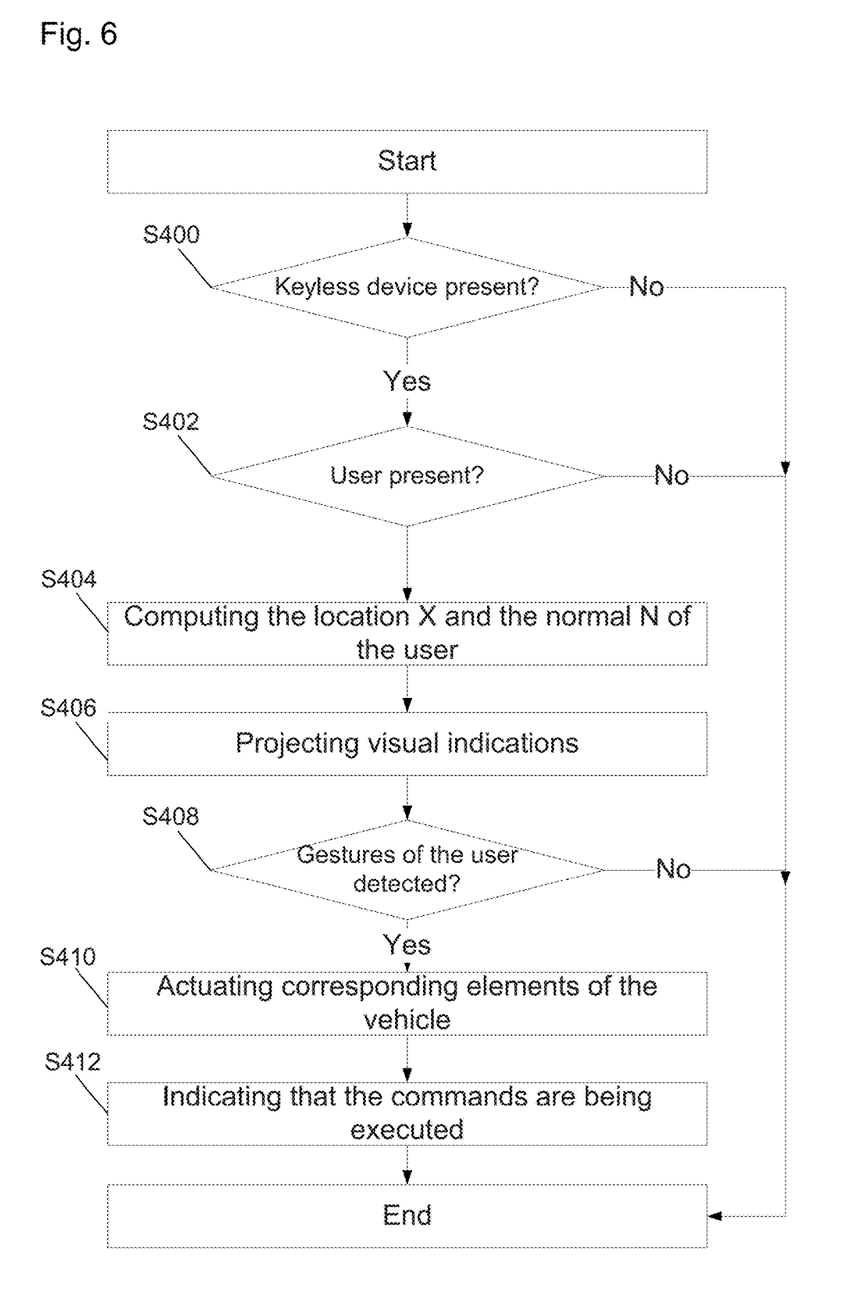
FIG. 6 is a flow chart of a method for the user to communicate with the vehicle through the visual communication apparatus, according to certain aspects of the disclosure.

FIG. 6 is a flow chart of a method to communicate with the vehicle 300 through the visual communication apparatus 100, according to certain aspects of the disclosure.

In a step S400, it is determined if the key fob 202 is present inside the keyless detection zone 208 through the smart key system 306. For example, the antenna 308 may broadcast the first group of radio waves and the RF receiver 308b may detect the second group of radio waves emitted back from RF transmitter 210b, after the first group of radio waves have been received by the LF receiver 210a. If it is determined that the key fob 202 is present inside the keyless detection zone 208, the process goes to a step S402. Otherwise, the process ends.

In the step S402, it is determined if the user 200 is present inside the projection zone 108 through the projector 102. The presence detection of the user 200 inside the projection zone 108 may be performed by detecting through the sensor 104 the reflection of infrared beam on the user 200, wherein the infrared are initially generated by the second laser diode 122. The presence detection of the user 200 inside the projection zone 108 may also be performed by analyzing digital images of the projecting zone 108 captured by the camera 104a. The analysis of digital images of the projecting zone 108 via image processing tools such as color intensity differences, image segmentations, edge detections or any other image processing tools known by a person having ordinary skill in the art. If it is determined that the user 200 is present inside the projecting zone 108, the process goes to a step S404. Otherwise, the process ends.

In the step S404, The location X and the normal direction N of the user 200 (as illustrated in FIG. 2) inside the projecting zone 108 is computed. The computation of the location X can be performed by analyzing the light reflected on the projecting zone 108 and the user 200 and captured by the sensor 104 via software instructions executed by the circuitry 101a.

In a step S406, the visual indications 106 (i.e., the active visual indications 106a and/or passive visual indications 106b) are projected by the projector 102 at the predetermined distance from the location X and at the predetermined direction U from the normal direction N of the user 200 (e.g., the front or sides).

The passive visual indications 106b may be symbols (e.g., arrows, gauge indicators, warning signals) or text providing information about the vehicle 300 (e.g., "vehicle moving in the direction of the arrows", "low fuel", "low battery", "low oil pressure", or "low tire pressure") to the user 200 and/or other persons and requiring no activation from the user 200.

The active visual indications 106a may be symbols (e.g., V-shaped lines, rectangles, squares, circles, arrows) or text requiring activation from the user 200 to perform specific commands (e.g., turning on/off lights of the vehicle 300, opening/closing a door of the vehicle 300) while the passive visual indications 106b may be symbols or text providing information about the vehicle 300 (e.g., "vehicle moving in the arrows direction", "low fuel", "low battery", "low oil pressure" or "low tire pressure") without any activation from the user 200.

In a step S408, gestures (e.g., stepping, foot tapping, heel raising or standing still) performed by the user 200 on the active visual indications 106a are detected and identified by the sensor 104 via software instructions executed by the circuitry 101a.

In a step S410, once the gestures of the user 200 on the active visual indications 106a have been detected and identified, The circuitry 101a sends a signal to the main circuitry 400 to actuate elements of the vehicle 300 (e.g., light switches, or door locks) to perform the specific commands (e.g., turning on/off lights of the vehicle 300, opening/closing a door of the vehicle 300) represented by active visual indications 106a. For example, the circuitry 101 can send a signal to the PBD/PSD ECU 430 of the main circuitry 400 to actuate the PBD/PSD actuator 320 in order to operate the back and/or slide door of the vehicle 300.

In a step S412, the active indications 106a is modified to indicate to the user 200 that the gestures have been recognized and the commands are being executed by the vehicle 300. The color, the shape or the text of the active indications 106a can be modified to let the user 200 know that the commands are being executed. For example, by having the projector 102 projecting a flashing light in a different color as well as having additional text (e.g., Caution door opening), the user 200 can be aware that the vehicle 300 is executing the commands.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the invention may be practiced otherwise than as specifically described herein.

What is claimed is:

1. A visual communication apparatus of a vehicle comprising:
    a smart key system that detects a key fob within a keyless detection zone;
    a projector that projects visual indications on a projecting zone on a ground surface, the visual indications including an active visual indication corresponding to a vehicle command;
    a sensor that captures gestures in an area defined by the active visual indication; and
    a control unit that actuates the vehicle command in response the gestures.

2. The visual communication apparatus of claim 1, further comprising a steering angle sensor that measures a steering angle to estimate a direction in which the vehicle is displaced.

3. The visual communication apparatus of claim 1, wherein the gestures include foot motions of a user.

4. The visual communication apparatus of claim 1, wherein the vehicle command includes opening and closing a door of the vehicle.

5. The visual communication apparatus of claim 1, wherein the visual indications include passive visual indications that display information regarding a status of the vehicle.

6. The visual communication apparatus of claim 1, wherein the active visual indication includes an inquiry of whether the vehicle command is to be actuated.

7. The visual communication apparatus of claim 1, wherein the sensor detects gestures based on reflected light in the area.

8. The visual communication apparatus of claim 1, wherein the vehicle command includes operating a light of the vehicle.

9. A method to communicate with a vehicle through a visual communication apparatus, the visual communication apparatus including a projector that projects visual indications on a ground surface, and a sensor that optically captures gestures of a user, the method comprising:
    detecting the presence of a key fob of the user inside a keyless detection zone through a smart key system;
    detecting the presence of the user inside a projecting zone;
    computing a location and a normal direction of the user inside the projecting zone;
    projecting visual indications at a predetermined distance from the location of the user and at a predetermined direction from the normal of the user, the visual indications including an active visual indication corresponding to a vehicle command;
    detecting gestures of the user in an area defined by the active visual indication;
    actuating the vehicle command through an electrical control unit in response to the gestures; and
    indicating to the user that the vehicle command is actuated.

* * * * *